United States Patent [19]

Salzer et al.

[11] 4,351,733
[45] Sep. 28, 1982

[54] PROCESS AND APPARATUS FOR PURIFICATION OF INDUSTRIAL WASTE WATER

[75] Inventors: Richard Salzer, Stuttgart; Hans-Ulrich Schwering, Leonberg, both of Fed. Rep. of Germany

[73] Assignee: Robert Bosch GmbH, Stuttgart, Fed. Rep. of Germany

[21] Appl. No.: 315,214

[22] Filed: Oct. 26, 1981

[30] Foreign Application Priority Data

Nov. 15, 1980 [DE] Fed. Rep. of Germany ....... 3043254

[51] Int. Cl.$^3$ .............................................. B01D 21/10
[52] U.S. Cl. ..................................... 210/738; 210/790; 210/802; 210/319; 210/320; 210/521
[58] Field of Search ............... 210/738, 790, 802, 804, 210/806, 259, 319, 320, 521, 522, 523

[56] References Cited

U.S. PATENT DOCUMENTS

| | | | |
|---|---|---|---|
| 3,472,764 | 10/1969 | Culp | 210/259 |
| 3,666,111 | 5/1972 | Pielkenrood et al. | |
| 3,706,384 | 12/1972 | Weijman-Hane | |
| 3,886,064 | 5/1975 | Kosonen | |
| 3,997,445 | 12/1976 | Hannestad | 210/319 |
| 4,059,529 | 11/1977 | McGiveen | 210/320 |
| 4,132,651 | 1/1979 | deJong | 210/522 |
| 4,290,898 | 9/1981 | Von Hagel | 210/522 |

FOREIGN PATENT DOCUMENTS

| | | | |
|---|---|---|---|
| 2261837 | 8/1974 | Fed. Rep. of Germany | |
| 2752296 | 5/1979 | Fed. Rep. of Germany | 210/521 |
| 54-162273 | 12/1979 | Japan | 210/522 |
| 55-43373 | 11/1980 | Japan | 210/521 |
| 2050185 | 1/1981 | United Kingdom | 210/522 |
| 2050338 | 1/1981 | United Kingdom | 210/522 |

*Primary Examiner*—Ernest G. Therkorn
*Attorney, Agent, or Firm*—Frishauf, Holtz, Goodman & Woodward

[57] ABSTRACT

A process and apparatus for the purification of industrial waste water containing solid particles. The apparatus contains at least two treatment sections. The first treatment section is a settling tank containing an agitation means, preferably an inclined deflector plate against which the waste water is directed to form a rolling wave and causing solid particles to coagulate and settle. The partially cleaned waste water overflow from the first stage is conveyed to the lower portions of the second stage into spaces between inclined plates which form an inclined plate pack clarifier. The solid particles are taken off from the bottom of the second treatment section, and clarified water is taken off from the top.

11 Claims, 2 Drawing Figures

PROCESS AND APPARATUS FOR PURIFICATION OF INDUSTRIAL WASTE WATER

The present invention provides an improved process and apparatus for clarifying waste water and removing solid particles therefrom.

BACKGROUND OF THE INVENTION

Industrial waste water results from the use of water as a cooling medium and also from the use of water in numerous wet-working processes, for example the use of water as a solvent in chemical processes and for such other uses as washing, soaking, distilling, filtering, and rinsing, which may involve the cleaning of apparatus used in these processes. Impurities are present in this industrial waste water in the form of solid or liquid components of the waste water which may be dissolved or partially in colloidal form, etc. The industrial waste water treatment is dependent, at least in part, on whether the impurities are of inorganic or organic origin. Such treatment includes biological treatment, for example by utilizing microorganisms, and chemical/or physical treatments. Neutralization and flocculation methods are technically classified as chemical waste water purification treatments. Acid-containing waste waters are generally neutralized, for example with lime. Alkaline waste waters are generally neutralized, with for example hydrochloric acid or sulfuric acid. The solid material which is precipitated in conjunction with and/or as an adjunct to treatments involving neutralization, for example finely divided sludge in the form of floc can be removed in a mechanical clarification apparatus adjoining the chemical treatment. Coagulation processes for the separation of material in suspension and in colloidal solution which do not settle are utilized.

The solid material in the form of sludge or flocs, which is the end-product of such a water purification process, is removed from the water in a sedimentation plant. Two types of gravity separators are generally used for this purpose.

Settling basins for waste water plants are basins through which the water is passed. The rate of flow of the water is reduced to such an extent that solid material can settle in the form of bottom sludge. Specific lighter materials can flow to the surface. Settling basins are usually rectangular in shape. Large plants have automatic means for removing sludge, such as blade scrapers, chain scrapers, or reciprocating blade scrapers, which through their back-and-forth motion at the edge of the basin push the coagulated sludge into a pump sump from which it is drawn off and transported by pumps.

Conventional settling basins have the disadvantage of requiring a large amount of space. Generally, the water authorities require retention periods of four to six times the flow rate, for example, a 10 $m^3$/hr flow rate for a settling basin volume of 40–60 cubic meters. These basins have the advantage that there is no critical reaction with respect to changes in the sludge content and in the volume of water flowing through the basin.

Conventional waste water plants also utilize inclined separators which are also called plate separators or lamella separators. These separators correspond to a plurality of settling tanks which are stacked one upon the other and are in an inclined position. Utilizing this construction, the sedimentation surface is multiplied for a given volume of tank. Because of the inclined position of the surfaces, the sludge slides down into the collecting portion of the inclined separator. Such an apparatus permits a substantial reduction of the retention time in the separator (for example as little as a few minutes) and therefore a smaller space requirement for the equipment for treatment of a given volume of waste water. These inclined separators are very high because of the height requirements for the stack of inclined plates on top of the sludge collector. This large height requirement is a disadvantage. These inclined separators are also very sensitive and do not operate well when there is a large sludge mass which occurs in surges. Furthermore, because of the short retention time the sludge does not thicken sufficiently so that the sludge removed from the inclined separator has to be further treated in special thickeners. Therefore, in practice the advantage of lesser volume of separator is in the context of all the equipment, lost, especially when using smaller units such as up to 10 $m^3$/hr.

It is an object of the present invention to provide an efficient process and apparatus for clarification of waste water and removal of fine particles therefrom.

THE INVENTION

The present invention provides a process and apparatus for treating waste water containing solids, generally neutralized industrial waste water in two treatment stages. In the first treatment stage, the waste water is introduced into a settling tank, preferably in a manner causing the waste water to move in a curved arc path. In the first stage, particles are removed by settling and the clarified water which still contains a considerable quantity of particles is conveyed to a second treatment stage. The second stage has a pack of inclined parallel plates. The waste water is introduced between these plates and rises with the clarified water being taken off at the top. Particles precipitate on the inclined plates and slide to a settling basin below the plates where they are removed in the form of precipitated sludge.

In a preferred embodiment, the waste water is introduced into the first stage through a conduit which discharges the waste water against an inclined deflector plate from which it is deflected in the form of a rolling or non-linear motion. The sludge which settles in the first stage is collected at the bottom of the settling tank and removed, preferably by a suction apparatus.

THE DRAWINGS

FIG. 1 is a partial side sectional view of the apparatus of the present invention; and FIG. 2 is a partial sectional top view.

DETAILED DESCRIPTION OF THE INVENTION

Figure 1:
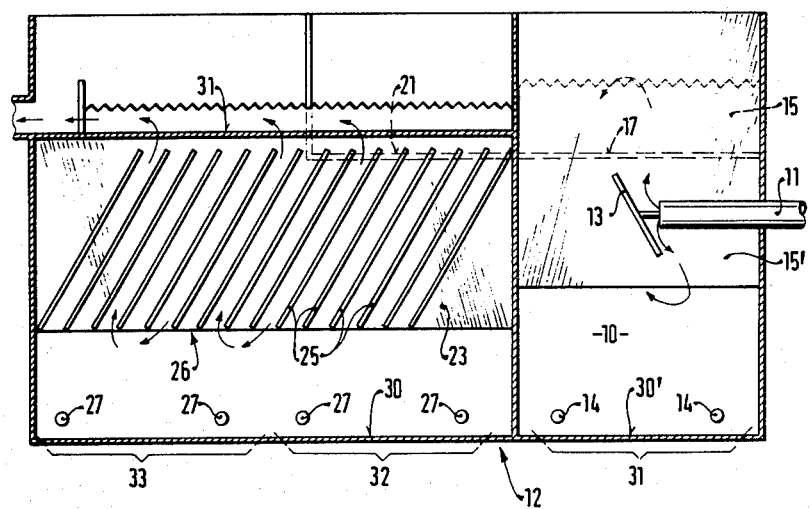
Figure 2:
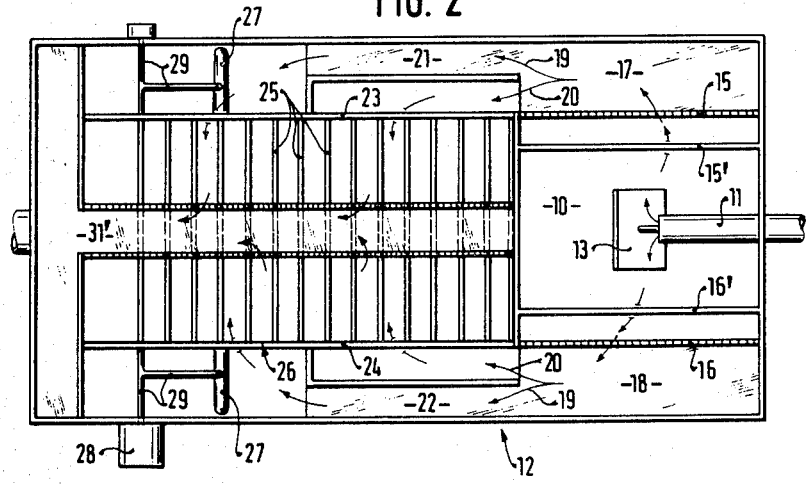

Neutralized industrial waste water is introduced into the separator through a conduit 11 to the first treatment stage in the settling tank 10. The settling tank 10 is located in a longitudinal sedimentation clarifying basin 12 at the bottom of the apparatus. The basin 12 is separated at about one-third to one-quarter of its long side to establish the different treatment stages. In the first stage, the waste water which is introduced through the conduit 11 is directed against the deflector plate 13 so that it is deflected therefrom in the form of a rolling wave. This causes effective agitation which assists in the formation of floc particles which contact each other in the agitated material and form large sludge floc particles which sink to the bottom of the settling tank 10 and are removed therefrom by means of a suction apparatus 14 which is schematically illustrated in the drawing. A preferred suction (removal) means is the evacuation apparatus which moves back-and-forth across the lower portion of the settling basin utilizing oscillating or reciprocal motion, see for example DE-PS 22 61 837 which is incorporated herein for disclosure of such an apparatus. The utilization of such a reciprocating evacuation means permits a compact construction of this portion of the apparatus.

In the respective upper side sections of the settling basin tank, overflow baffles 15,16 are provided. The waste water which is pre-cleaned in basin 10 flows over the baffles 15 and 16 into respective channels 17,18. The basin 10 also contains downflow baffles 15',16' positioned inward (toward the center) of the overflow baffles 15,16. The downflow baffles 15',16' are positioned underneath the level of the waste water at the level at which it flows over the overflow baffles 15,16. These downflow baffles 15',16' also serve to make the water level in the regions of the overflow baffles 15,16 more calm or placid.

The water which overflows the baffles 15,16 moves into the respective channels 17,18 on the right and left side of the longitudinal basin 12. The pre-cleaned water is divided into branch portions 19,20 and uniformly fed from below to the plate pack 25 of the inclined second treatment station of the separator. The pre-cleaned water from channels 17,18 are directed to the bottom of the second treatment stage of the separator under the plate pack 25 by vertical channels 21,22 which are defined on one side by means of perpendicular downward baffles 23,24 which direct the pre-cleaned water from the first stage to the bottom of the plate pack 25 for further clarification in the second treatment stage. This second treatment stage is also located in the longitudinal sedimentation basin 12. Because of the enlargement of the sedimentation area by using the plate pack 25 together with the use of a lower total height in which sedimentation is carried out, fine sludge particles which are still in suspension in the pre-cleaned water exited from the first treatment stage, are precipitated on the inclined plates and slide to the bottom of the basin. The clarified (cleaned) water from the second treatment stage rises up between the inclined plates to the top and is collected by a collecting conduit 31' located centrally above the plates in the form of a trough.

The precipitated sludge which collects on the bottom 30 of the settling tank and of the inclined clarifier section and which thickens on the bottom, is drawn off by several suction pipes 14,27. The suction pipes are positioned cross-wise to the longitudinal axis of the longitudinal sedimentation basin and are moved in a reciprocating manner over the bottom 30,30' of the basin by means of a mechanical apparatus 28 utilizing a rack (rod) system 29. It is strongly preferred that a separate evacuation system should be utilized in each of the respective sedimentation zones 31 through 33. By doing so, the amount of sludge which is taken from the basin can be adjusted (related) to the corresponding yield of sludge which is deposited in the sedimentation process.

The volume of the overall settling (clarifying) basin is dimensioned so that a retention time of from about one-half hour to one hour occurs. This assures satisfactory thickening of the sludge so that separate auxiliary thickeners are not required.

A preferred embodiment of the installation of the present invention has, for examples, the following dimensions. A total volume of the longitudinal sedimentation basin is 2 cubic meters; of which 0.7 cubic meter is allocated to the settling tank 10 (pre-sedimentation zone) and 1.3 cubic meters to the basin beneath the inclined clarifier 26 which contains the plate pack 25. This results in an effective clarifying area of 0.4 square meters in the settling tank 10 and of 4.7 square meters in the inclined clarifier 26 which contains 17 plates. Each plate has an area of about 0.28 square meters. This results in a total clarifying (settling) area of 5.1 square meters and a space requirement of approximately 2 square meters for the base of the installation. It is therefore apparent that the space requirement for the complete installation is very small. With a retention time of one-half hour, waste water from an electrolytic plant having a sludge content of 200 ml/per liter with a coagulation agent added at the inlet of the clarifier was clarified so that no turbidity could be detected. The sludge taken from the basin was easily filtered.

The process and apparatus of the present invention has a unique combination of advantages. The equipment is compact and has small space requirements relative to the amount of waste water which is treated. Because of the combination of the pre-clarification in the settling tank and the after-clarification in the second stage utilizing the inclined plates, the possibility of a sludge surge resulting in the water coming from the unit containing sludge, is prevented. Because of the removal of particles in the first stage, the plates in the second treatment stage may be closer together which results in improvement in the separation of fine particles. Through the favorable control of the first stage in the settling basin and of the subsequent clarification stage utilizing the inclined plates, it is possible to reduce the average retention time and therefore also reduce the height of the installation without adversely affecting the condition of thickening of the sludge.

The utilization of the reciprocally moving suction means beneath the plate pack is advantageous since a funnel arrangement for the sludge is not necessary, thereby resulting in a lesser height requirement for the apparatus without losing the large sludge collecting space. The division of the basin into separate sludge evacuation zones or sections also permits a more effective sludge thickening action.

The utilization of the deflector baffle 13 in the settling basin 10 which causes the circular (rotary) motion of the waste water in the settling tank has the further advantage that a separate agitation means which is required for the formation of floc particles is not required.

The further feature of dividing the water from the first stage into several separate streams which are introduced to different portions of the inclined plate pack in the second treatment stage has the advantage of providing uniform distribution of the load to the plates in the second stage. This separation into separate streams is accomplished by the longitudinally (laterally) positioned channels along the outer portions of the apparatus which convey the pre-treated water to the desired specific positions in the inclined plate pack into which it is desired to introduce the waste water. As a result, one portion of the plate pack does not become overloaded while other portions are under-utilized. This also permits greater freedom in design of the dimensions of the individual portions of the settling basin.

When the waste water contains very fine particles (slime) which do not settle readily, apparatus may be utilized with an enlarged plate section. This can be done by adding a third treatment stage which like the second stage comprises an inclined plate pack with however the distances between the plates shorter (closer plate spacing). Because of the pre-clarification in the settling basin 10 and the further coagulation and particle removal in the first treatment stage, such an apparatus provides clarified water without the possibility of a sludge breakthrough even though the distance between the plates is unusually small. All of the foregoing contribute to the overall efficiency of removal of solids in the process and apparatus of the present invention utilizing a compact apparatus.

Various changes and modifications may be made within the inventive concept.

We claim:

1. A process for the purification of industrial waste water containing solid particles comprising introducing said waste water into a settling tank with agitation wherein a portion of the solid particles in said waste water form flocs and settle in the form of sludge and clarified waste water which contains the remainder of said solid particles which overflow the settling tank, dividing said clarified waste water into several streams, conveying each of said several streams to respective lower portions of spaces between the plates of a first inclined plate pack wherein the solid particles coagulate in the space between the plates, and the coagulated particles settle on the plates and slide to the bottom thereof and then into the bottom of a receiving basin and are removed therefrom, and clarified water rises between the plates and is taken off through an overflow at the top.

2. The process of claim 1 wherein said waste water is introduced into said settling tank through an orifice and then directed against an inclined deflector plate 13 from which it is deflected thereby agitating said waste water in said settling tank.

3. The process of claim 1 or 2 wherein the sludge at the bottom of said settling tank is removed by a suction apparatus.

4. The process of claim 1 or 2 wherein the partially clarified waste water in said settling tank flows beneath downflow baffles (15',16') and over sidewalls (15,16) into laterally disposed channels (17,18) and is passed through said channels to the inclined plate pack.

5. The process of claim 1 or 2 wherein the coagulated particles are removed from the bottom of said receiving basin 30 by suction pipes (27) positioned crosswise to the longitudinal axis of the receiving basin and wherein said suction pipes 27 are moved back and forth in an oscillatory movement to remove said coagulated particles from the bottom of said receiving basin.

6. The process of claim 1 or 2 wherein said clarified water rising between the plates which is taken off through an overflow at the top contains fine solid particles and is conveyed to the lower portions of the spaces between the plates of a second inclined plate pack having closer spacing between the plates than said first inclined plate pack, and wherein the fine solid particles coagulate in the space between the plates, and the coagulated particles settle on the plates and slide to the bottom thereof, and then into the bottom of a receiving tank and are removed therefrom, and clarified water rises between said inclined plates and is taken off through an overflow at the top.

7. Apparatus for the purification of industrial waste water containing solid particles comprising a longitudinal settling basin (12) separated into at least two treating zones;

said first treating zone comprising a settling tank (10) containing means for agitating waste water introduced thereto;

said second treatment zone comprising an inclined plate pack (25) having spaces between said plates;

means for removing clarified overflow from the settling tank;

means for dividing said clarified overflow into several streams;

means for conveying each of said several streams to the respective lower spaces between the plates of said inclined plate pack wherein the solid particles coagulate in the space between the plates; and said longitudinal tank having means in the lower portion of at least one of the settling tank (10) comprising the first treatment zone and the bottom of said basin under said inclined plate pack for removing sludge from the bottom of said basin.

8. The apparatus of claim 7 wherein said means for agitation in said first treatment zone comprises means for introducing a stream of waste water into said first treatment zone and directing said stream against an inclined deflector plate in said first treatment zone.

9. The apparatus of claim 7 or 8 wherein said first treatment zone contains downflow baffles (15',16') on opposed sides thereof and also contains overflow baffles (15,16) between said respective downflow baffles and the sidewalls defining said first treatment zone, and wherein said apparatus contains conduits (17,18) longitudinally arranged between said overflow baffles and said sidewalls and longitudinally positioned to direct water from the first treatment zone to the second treatment zone.

10. The apparatus of claims 7 or 8 comprising side channels (21,22) and downflow baffles (23) at the sides of said inclined plate pack positioned in contact with said conduits (17,18) to provide for uniform distribution and direction of the waste water from the first treatment zone to the bottom of the inclined plates in the second treatment zone, and also comprising a centrally positioned discharge conduit (31) above the inclined plates to guide the clarified waste water to a discharge port in said apparatus.

11. The apparatus of claim 7 whereby said means for removing sludge from the bottom of said basin comprises suction pipes (27) which are positioned crosswise to the longitudinal axis of said basin and comprising a drive unit and rod system to move said suction pipes (27) back and forth in an oscillating fashion on the bottom of the basin (30) to remove sludge from the bottom of said basin.

* * * * *